(12) United States Patent
Finsterbusch et al.

(10) Patent No.: US 9,074,755 B2
(45) Date of Patent: Jul. 7, 2015

(54) LIGHTING DEVICE

(75) Inventors: Klaus Finsterbusch, Berlin (DE); Ulrich Hartwig, Berlin (DE)

(73) Assignee: OSRAM GmbH, Munich (DE)

( * ) Notice: Subject to any disclaimer, the term of this patent is extended or adjusted under 35 U.S.C. 154(b) by 62 days.

(21) Appl. No.: 13/992,177

(22) PCT Filed: Nov. 15, 2011

(86) PCT No.: PCT/EP2011/070094
§ 371 (c)(1),
(2), (4) Date: Jun. 6, 2013

(87) PCT Pub. No.: WO2012/076296
PCT Pub. Date: Jun. 14, 2012

(65) Prior Publication Data
US 2013/0271947 A1    Oct. 17, 2013

(30) Foreign Application Priority Data

Dec. 6, 2010   (DE) .......................... 10 2010 062 465

(51) Int. Cl.
| | | |
|---|---|---|
| G02B 27/20 | (2006.01) |
| F21V 13/08 | (2006.01) |
| F21K 99/00 | (2010.01) |
| F21S 8/10 | (2006.01) |
| G03B 21/20 | (2006.01) |

(Continued)

(52) U.S. Cl.
CPC . *F21V 13/08* (2013.01); *F21K 9/56* (2013.01); *F21S 48/114* (2013.01); *F21S 48/1145* (2013.01); *F21Y 2101/02* (2013.01); *G03B 21/204* (2013.01); *F21S 48/00* (2013.01); *F21V 21/14* (2013.01)

(58) Field of Classification Search
CPC ...... G02B 26/008; G02B 7/006; F21V 14/08; F21V 13/14; F21V 7/08; F21V 9/08; F21V 9/10; G03B 21/204; G03B 21/142; F21K 9/56; F21W 2131/406; F21Y 2101/025; H04N 9/3161
USPC .............. 362/84, 230–232, 236–245, 249.01, 362/249.02, 259, 269, 275–277, 282, 283, 362/291, 293, 308, 309, 311.01, 311.02, 362/311.08, 319, 322, 326, 328, 341, 347, 362/507, 543–545, 555, 556, 800, 35, 362/166–170, 174, 213, 323, 509, 510, 362/538–540, 802
See application file for complete search history.

(56) References Cited

U.S. PATENT DOCUMENTS

| | | | |
|---|---|---|---|
| 7,165,871 B2 * | 1/2007 | Takeda et al. ................. 362/538 |
| 7,540,616 B2 * | 6/2009 | Conner ........................ 353/20 |
| 7,651,243 B2 * | 1/2010 | McGuire et al. .............. 362/293 |

(Continued)

FOREIGN PATENT DOCUMENTS

| | | |
|---|---|---|
| CN | 1613262 | 5/2005 |
| CN | 1776478 | 5/2006 |

(Continued)

*Primary Examiner* — Hargobind S Sawhney
(74) *Attorney, Agent, or Firm* — Cozen O'Connor (57) ABSTRACT

A lighting device, comprising at least one reflector, at least one luminous region containing phosphor, and at least one laser, wherein the at least one luminous region is adapted to be excited to emit light by at least one laser and at least part of the light emitted by the at least one luminous region is incident on the at least one reflector.

13 Claims, 8 Drawing Sheets

(51) Int. Cl.
 *F21V 21/14* (2006.01)
 *F21Y 101/02* (2006.01)

(56) References Cited

U.S. PATENT DOCUMENTS

| | | | |
|---|---|---|---|
| 7,692,861 B2 * | 4/2010 | Robinson | 359/489.08 |
| 2005/0105301 A1 | 5/2005 | Takeda et al. | |
| 2005/0151939 A1 | 7/2005 | English et al. | |
| 2006/0104065 A1 | 5/2006 | Lee et al. | |
| 2007/0279911 A1 * | 12/2007 | Kittelmann et al. | 362/328 |
| 2008/0094528 A1 * | 4/2008 | Robinson et al. | 349/1 |

FOREIGN PATENT DOCUMENTS

| | | |
|---|---|---|
| CN | 101517467 | 8/2009 |
| CN | 101581410 | 11/2009 |
| EP | 1 357 332 | 10/2003 |
| JP | 2000-219214 | 8/2000 |
| JP | 2003-066316 | 3/2003 |
| JP | 2004-341105 | 12/2004 |
| JP | 2005-150041 | 6/2005 |
| JP | 2009-099539 | 5/2009 |
| JP | 2009-277516 | 11/2009 |
| JP | 2010-504617 | 2/2010 |
| WO | WO 2005/108854 | 11/2005 |
| WO | WO 2006/133214 | 12/2006 |

* cited by examiner

LIGHTING DEVICE

RELATED APPLICATIONS

This is a U.S. national stage of International application No. PCT/EP2011/070094 filed on Nov. 15, 2011.

This patent application claims the priority of German application no. 10 2010 062 465.9 filed Dec. 6, 2010, the disclosure content of which is hereby incorporated by reference.

FIELD OF THE INVENTION

The invention relates to a lighting device comprising at least one reflector, at least one luminous region containing phosphor, and at least one laser for exciting the at least one luminous region.

BACKGROUND OF THE INVENTION

WO 2009/112961 A1 describes a laser light source comprising at least one element that emits laser light, at least one light source output element (which is designed to direct the laser light onto a predetermined location) and at least one conversion element. The at least one conversion element comprises a set of wavelength conversion regions which are designed to convert the laser light into wavelength-converted or converted light, such that a combination of the converted light and the laser light generates a desired output mixed light.

SUMMARY OF THE INVENTION

One object of the present invention is to provide an improved lighting device.

This and other objects are attained in accordance with one aspect of the present invention directed to a lighting device, comprising at least one reflector, at least one luminous region containing phosphor, and at least one laser, wherein the at least one luminous region can be excited to emit light by means of at least one laser and at least part of the light emitted by the at least one luminous region is incident on the at least one reflector.

Such a lighting device can also be designated as a laser activated remote phosphor device or LARP device.

The phosphor region may have one or a plurality of phosphors that are able to convert incident laser light at least partly into wavelength-converted or converted light. The fact that the phosphor region or the phosphor thereof is able to at least partly wavelength-convert light emitted by the light source can encompass, in particular, the fact that one portion of the light radiated onto the phosphor region by the light source is absorbed by at least one phosphor of the phosphor region and is reemitted with a changed, in particular larger ("down-converting") or smaller ("up-converting"), wavelength (e.g. from blue to yellow). Another portion of the light can be emitted again from the phosphor region without a wavelength conversion. Consequently, a single-colored light radiated in by the assigned light source can be emitted by the phosphor region as mixed light (as a combination of the wavelength-converted portion and the non-wavelength-converted portion), e.g. as a white (blue/yellow) mixed light. A phosphor region can be adjustable in a targeted manner with regard to its thickness and/or a concentration of the at least one phosphor such that a wavelength-converted portion is thus also adjustable in a targeted manner. In particular, by means of a sufficiently high phosphor concentration and/or a sufficiently large thickness, the incident light can be substantially completely wavelength-converted. This can correspond in particular to a degree of conversion of at least approximately 95%, in particular of at least approximately 98%, in particular of at least approximately 99%.

The wavelength conversion can be carried out for example on the basis of luminescence, in particular photoluminescence or radio luminescence, in particular phosphorescence and/or fluorescence.

The phosphor regions can emit light diffusely, in particular, which enables a high intensity homogeneity and wide irradiation of the optical element disposed downstream.

Moreover, a plurality of lasers, in particular laser diodes, can illuminate the same phosphor region and/or a laser beam can be expanded by means of a primary optical unit, e.g. a primary lens, in order to illuminate the phosphor homogeneously.

In one configuration, the light source is a narrow-radiant light source. A narrow-radiant light source can be understood to be, in particular, a light source in which an aperture angle of an emitted light beam is not greater than 5°, in particular not greater than 2°.

In one development, the light source emits light having a small bandwidth, in particular monochromatic light. The light emitted by the at least one light source can thus be effectively coordinated with the phosphor. The light source can be, in particular, a narrowband light source, alternatively, e.g. a broadband light source equipped with an optical bandpass filter.

In a further configuration, the light source is a laser light source. The laser light source has the advantages that it emits narrowband light having a small aperture angle ("narrow-radiant") and, moreover, can be compact and inexpensive. In one development, the laser light source is a laser diode. The latter can be configured in a particularly compact and robust fashion. Moreover, laser diodes can be operated together in groups in a simple manner, e.g. as a stack ("laser stack").

In one configuration, at least one optical integrator for combining the light emitted from the at least one reflector is disposed downstream of the at least one reflector.

In another configuration, the at least one phosphor region is arranged on a rotating phosphor carrier.

In another configuration, a plurality of phosphor regions are arranged segment by segment on the phosphor carrier.

In another configuration, the phosphor carrier is displaceable transversely with respect to a rotational plane at a focal point of the at least one reflector.

In another configuration, the phosphor carrier is embodied in the form of a disk, a cylinder or a truncated cone.

In another configuration, the at least one phosphor region can be arranged or is arranged at a focal point of the at least one reflector.

In another configuration, at least one phosphor region is oriented perpendicularly or parallel to a half-plane of at least one reflector.

In another configuration, at least one luminous region is oriented at an acute angle with respect to a half-plane of at least one reflector.

In another configuration, the luminous region is applied on a planar surface.

In another configuration, the luminous region is applied on a curved surface.

In another configuration, the lighting device furthermore comprises at least one secondary optical unit, in particular reflector, in particular mirror, which is configured and arranged for reflecting light which would emerge from the at least one reflector in an unreflected manner back into the at least one reflector, in particular onto the at least one luminous region.

In another configuration, wherein the rotating phosphor carrier has a plurality of phosphor regions which emit light of different colors, a filter wheel having a plurality of filter segments is disposed optically downstream of the rotating phosphor carrier, the filter wheel is synchronized with the rotating phosphor carrier, and the filter segments of the filter wheel have a transmission property coordinated with the light emitted by the phosphor regions.

In another configuration, the rotating phosphor carrier has a plurality of segments that can be illuminated by the at least one laser, wherein at least one segment has a respective phosphor region and at least one segment has a window for the wavelength-invariant transmission of light incident on the window.

In another configuration, the lighting device is designed to split light emerging from the at least one reflector into substantially different spatial regions depending on a color of the emerging light, the lighting device has at least one color-selective reflector, in particular dichroic mirror, in at least one of the spatial regions, and the at least one color-selective reflector is provided for reflecting light of a color provided for a different spatial region.

In another configuration, the lighting device is designed to transmit light having a predetermined direction of polarization from the at least one reflector and to reflect light having a direction of polarization perpendicular thereto back into the at least one reflector.

In another configuration, the lighting device is designed to transmit light having a predetermined direction of polarization from the at least one reflector and to reflect light having a direction of polarization perpendicular thereto back onto the at least one luminous region 3.

In another configuration, the lighting device has at least one grid polarization device.

In another configuration, the lighting device has at least one polarization beam splitter.

In another configuration, at least one half-wave plate is disposed downstream of the at least one polarization beam splitter.

In another configuration, the at least one reflector has at least one half-shell reflector.

In another configuration, the at least one reflector has at least one elliptical reflector and the at least one elliptical reflector is lengthened beyond a minor vertex of an ellipse on which its contour is based.

In another configuration, the light device is an automobile lighting device.

The lighting device can generally be used by itself or in a group with other lighting devices that are identical or of identical type. By way of example, in the case of a plurality of lighting devices, one or a plurality of color channels can be represented by means of one or a plurality of respective lighting devices. This may be advantageous in particular for a projection application in which the primary colors required for projection applications are generated sequentially or in parallel.

DETAILED DESCRIPTION OF THE DRAWINGS

Figure 1:
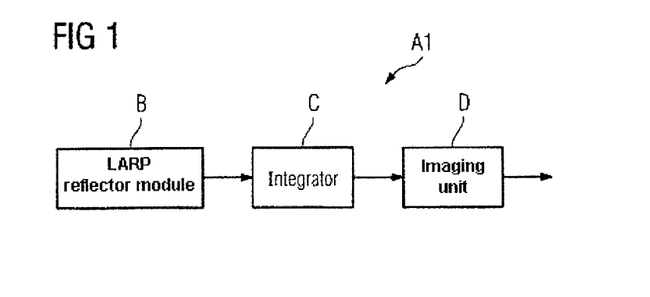
FIG. 1 shows one possible use of a LARP lighting device.

FIG. 1 schematically depicts one possible use of a lighting device A1, e.g. an LARP lighting device, as also described above using sequential color generation, for example by means of an individual LARP reflector module B with a rotating phosphor carrier (phosphor wheel). The light generated by the LARP reflector module B is firstly homogenized in an integrator C and then guided onto an imaging element or imaging unit D.

Figure 2:
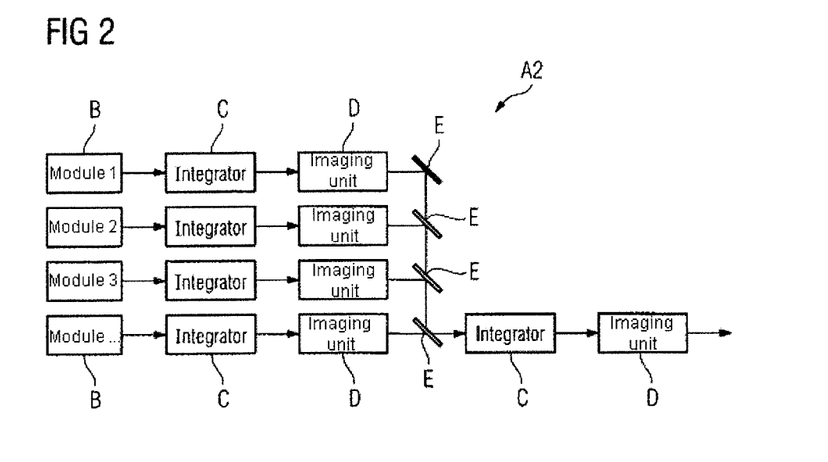
FIG. 2 shows another possible use of a LARP lighting device.

As shown for the lighting device A2 in FIG. 2, in the case of a plurality of parallel color channels, different-colored light from different LARP reflector module B can be combined by means of dichroic mirrors E. In the case of three color channels, for example a so-called X-cube can be used. The integrator C for homogenizing the light distribution and the imaging element D can be positioned upstream or downstream of the color combination depending on the type of imaging unit (LCD, DLP or ELCOS etc.).

Figure 3:
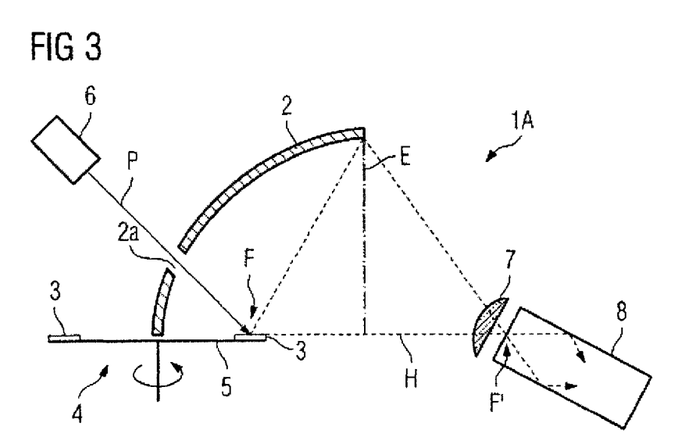
FIG. 3 shows a view, in section, of a LARP lighting device according to an embodiment of the invention.

FIG. 3 shows, as a sectional illustration in side view, one possible configuration of the LARP reflector module B and of the integrator C, namely the lighting device 1A. The lighting device 1A has a here elliptical half-shell reflector 2, at the focal point F of which is situated a phosphor region 3 having at least one phosphor. The phosphor region 3 is arranged here on a rotatable or rotating phosphor carrier 4, to put it more precisely on the main body 5 thereof. When the phosphor carrier 4 rotates, during a time segment in each case one segment of the phosphor region 3 or a plurality of phosphor regions 3 can be excited e.g. to luminescence sequentially by one or a plurality of lasers 6 (e.g. having a wavelength in an ultraviolet/blue spectral range between 350 nm and 460 nm) by irradiation with pump light or primary laser light P. Different phosphor regions 3 can emit light of different colors.

The half-shell reflector 2 can have, in particular, an elliptical, parabolic or freeform contour, but is not restricted thereto. The half-shell reflector 2 can have corresponding openings 2a or holes for transmitting the primary laser light P from a laser 6 arranged externally.

These elements 1 to 6 can be, for example, parts of an LARP reflector module B.

Disposed optically downstream of the half-shell reflector 2 is a lens 7, in particular cylindrical lens, and behind that an integrator 8, which can serve e.g. as the integrator C. A lens entrance surface of the integrator 8 is situated at least approximately at the other focal point F' relative to the focal point F, such that all light emitted by the half-shell reflector 2 through its light exit plane E is incident in the integrator 8, as indicated by the dashed lines. The integrator 8 here is an optical waveguide. The integrator 8 here is situated obliquely with respect to a half-plane H of the half-shell reflector 2, but this is not mandatory.

Figure 4:
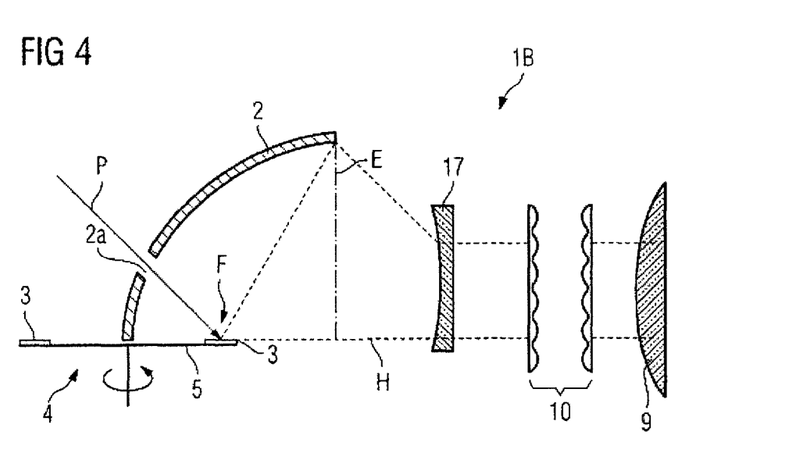
FIG. 4 shows a view, in section, of a LARP lighting device according to another embodiment of the invention.

FIG. 4 shows a lighting device 1B which can be used as an alternative or in addition and in which the elliptical reflector 2 is equipped in combination with a downstream diverging lens 9 and a fly's eye condenser 10 as integrator.

Figure 5:
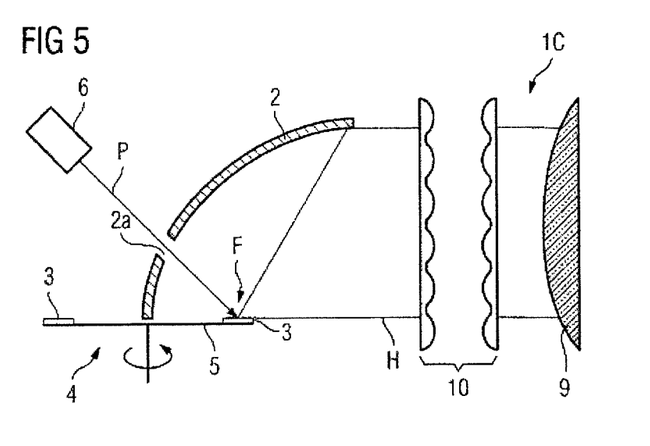
FIG. 5 shows a view, in section, of a LARP lighting device according to another embodiment of the invention.

FIG. 5 shows a lighting device 1C in which the half-shell reflector 2 is a parabolic reflector, and the fly's eye condenser 10 and the diverging lens 9 are disposed optically downstream thereof.

Figure 6:
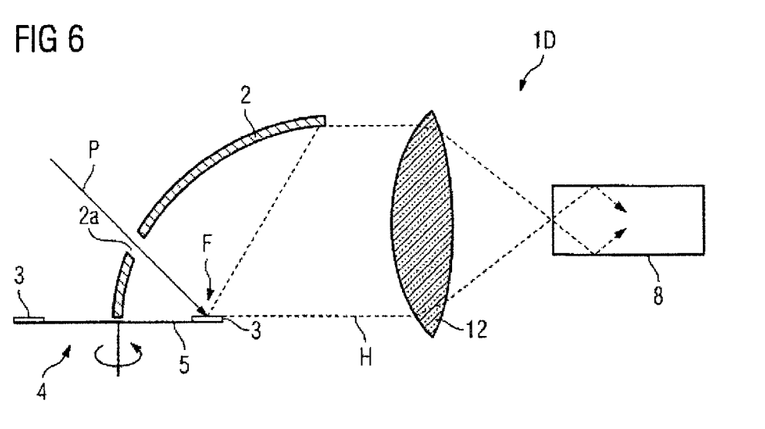
FIG. 6 shows a view, in section, of a LARP lighting device according to another embodiment of the invention.

FIG. 6 shows a lighting device 1D in which the half-shell reflector 2 is a parabolic reflector, and a converging lens 12 and the integrator 8 embodied as an integrating optical waveguide are disposed optically downstream thereof.

Depending on the wavelength of the laser used, e.g. "blue", the primary laser light can also be used directly for color mixing. In this case, at least one segment, e.g. the "blue" segment, of the rotating phosphor carrier 4 consists of a scattering region instead of a phosphor region 3.

The homogenizing effect of the integrator 8 in the form of the integrating optical waveguide or integrator rod can generally be improved by the lens 7, in particular in the form of a cylindrical lens, which is positioned directly in front of the integrator 8, as a result of which the integrator length can be reduced. This is shown purely by way of example in FIG. 3.

Figure 7:
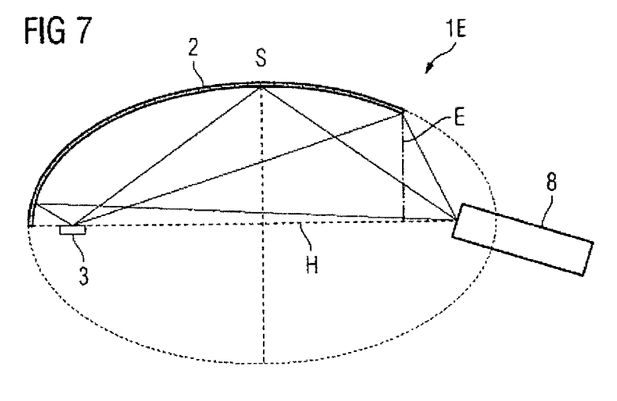
FIG. 7 shows a view, in section, of a LARP lighting device according to another embodiment of the invention.

In the case of elliptical reflectors, the reflector contour corresponds to the surface of an ellipsoid of revolution. The geometry of the half-shell reflector 2 used here allows the half-shell reflector 2 to be lengthened beyond a minor vertex S of the underlying ellipse as shown for the lighting device 1E in FIG. 7. This firstly facilitates the homogenization of the light distribution in the downstream integrator 8; secondly, this reduces losses that arise as a result of light escaping directly through the front reflector opening or light exit plane E.

In the case of sequential color generation with phosphor regions 3 of a rotatable phosphor carrier 4 that are subdivided into color segments and at an excitation wavelength in the visible spectral range, for example at approximately 440 nm to 460 nm, the color space can be greatly reduced. The cause is the, e.g. blue, pump light scattered by the, e.g. non-blue, phosphor regions 3, that is to say that ("primary-colored") light which is neither converted nor absorbed by the phosphor regions 3. In order to avoid this primary or primary-colored background or color noise, by way of example, the embodiments shown in FIG. 3 to FIG. 6 can be modified such that the primary-colored background light is suppressed.

Figure 8:
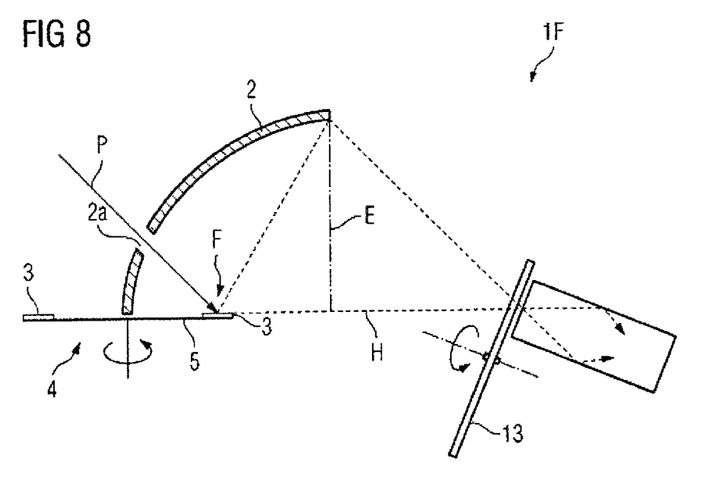
FIG. 8 shows a view, in section, of a LARP lighting device according to another embodiment of the invention.

FIG. 8 shows for this purpose a use of a synchronous filter wheel 13 in a lighting device 1F. In this case, as integrator 8 use is made of an optical waveguide having a small cross section (e.g. approximately 5 mm) in combination with a focusing optical unit, e.g. the lens 7 or the converging lens 12, as shown e.g. in FIG. 3 and FIG. 6. Furthermore, the filter wheel 13 can be positioned directly in front of the integrator 8, which filter wheel is synchronized with the rotatable phosphor carrier 4 and the filter segments of which filter wheel have a transmission coordinated with the emission of the color segments of the rotatable phosphor carrier 4 and can thus filter out the primary-colored background.

Generally, at least one dichroic mirror can be used instead of the filter wheel 14.

In order to suppress the primary-colored background, e.g. blue scattered light in the non-blue color segments, the primary-colored segment of the rotatable phosphor carrier 4 can be embodied as transparent, such that the primary-colored useful light, in particular pump light or primary laser light, is spatially separated from the other colors which are generated by an excitation of the at least one phosphor region 3. As a result, the primary-colored, e.g. blue, scattered light can be suppressed with a stationary color filter or a dichroic mirror 15.

Figure 9:
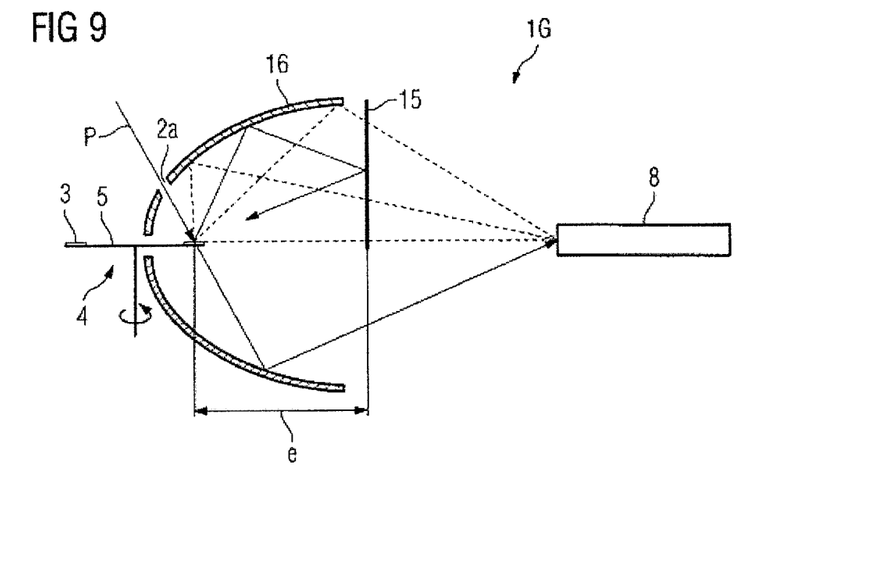
FIG. 9 shows a view, in section, of a LARP lighting device according to another embodiment of the invention.
Figure 10:
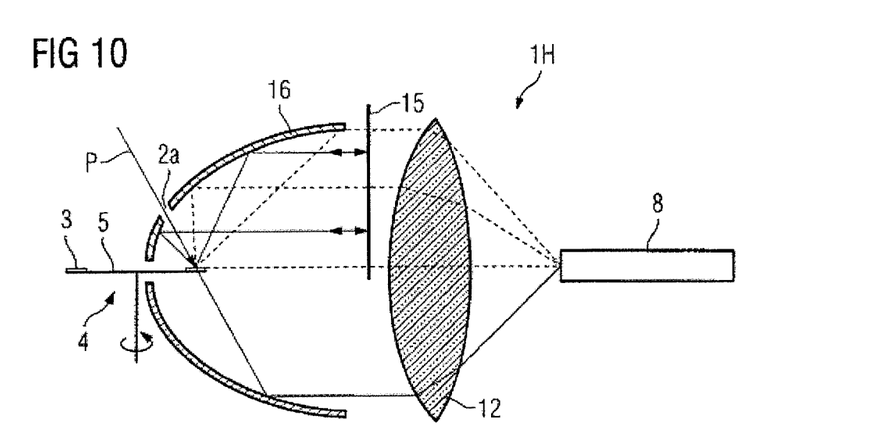
FIG. 10 shows a view, in section, of a LARP lighting device according to another embodiment of the invention.

In this case, the reflector 16 is preferably embodied as rotationally symmetrical in order to concentrate the transmitted light of the primary laser light. FIG. 9 shows such a lighting device 1G comprising an elliptical reflector 16. FIG. 10 shows such a lighting device 1H comprising a parabolic reflector 16 and the converging lens 12. The lighting devices 1G and 1H are therefore designed, in particular, to split light emerging from the at least one reflector 16, depending on a color of the emerging light, into substantially different spatial regions (e.g. a blue-radiant, here lower, spatial region and a non-blue-radiant, here upper, spatial region at the light exit plane E), wherein the lighting devices 1G and 1H have at least one color-selective reflector, in particular dichroic mirror 15, in at least one of the spatial regions, wherein the at least one color-selective reflector, namely the dichroic mirror 15 is provided for reflecting light of a color provided for a different spatial region. With the color filter being present, the filtered light is absorbed.

The use of a dichroic mirror 15 has the particular advantage that the scattered pump light is focused again onto the at least one phosphor region 3. In this way, the losses as a result of incomplete conversion of the pump light are reduced and the total efficiency of the lighting device increases. In combination with an elliptical reflector 16, the dichroic mirror 15 for this purpose will preferably be positioned in the plane of symmetry of the ellipsoid, that is to say at the distance e from the focal point F, where e is the linear eccentricity of the ellipsoid. This is indicated by way of example in FIG. 9.

In the case, too, of the reflector 16 representing a full reflector, the rotatable phosphor carrier 4 is irradiated only on one side, even if irradiation on two sides is possible, in principle. Irradiation on one side has the advantage that overheating of the at least one phosphor region 3 can better be avoided.

Figure 11:
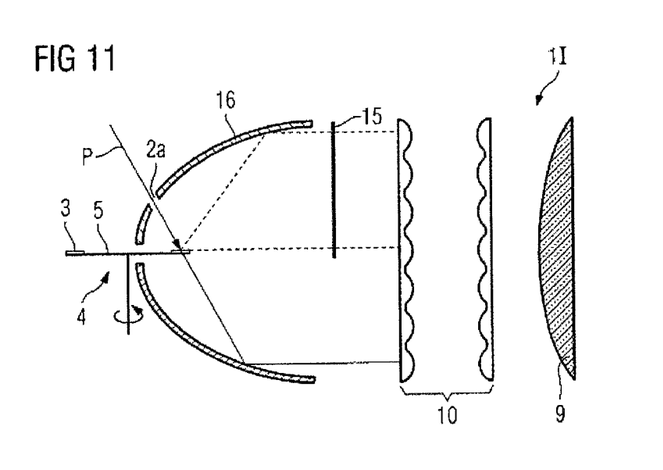
FIG. 11 shows a view, in section, of a LARP lighting device according to another embodiment of the invention.

By using the fly's eye condenser 10 as the integrator, as shown for the lighting device 1I in FIG. 11, and by means of a superimposition of primary-colored and non-primary colored (wavelength-converted) light upstream of the fly's eye condenser 10, it is possible for both a homogeneity of the light distribution and a transmission to be optimized. In this case, as in FIG. 4, it is possible to use a collimating optical unit 17 upstream and the diverging lens 9 downstream of the fly's eye condenser 10.

Figure 12:
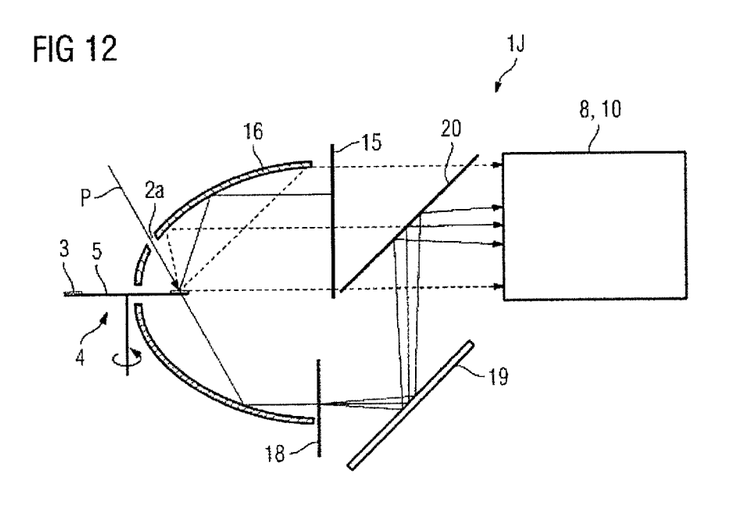
FIG. 12 shows a view, in section, of a LARP lighting device according to another embodiment of the invention.

FIG. 12 shows a lighting device 1J in which the primary-colored light is firstly expanded or diverged somewhat (e.g. by means of a diverging lens 18) and is then superimposed with the non-primary-colored light with the aid firstly of a conventional mirror 19 and then of a semitransparent mirror 20 (e.g. a further dichroic mirror), which simplifies the homogenization of the light distribution. The downstream integrator can be embodied as an optical waveguide integrator 8 or as a fly's eye condenser 10. In the former case, the radiation beam is preferably also focused into the integrator 8.

If the imaging element requires light having a specific direction of polarization, such as, for example, for liquid crystal screens or ELCO, unpolarized light emitted by the at least one phosphor region 3 must firstly be polarized. In order to prevent half of the generated light from being lost in the process, a polarization beam splitter is used and the unrequired polarization component is rotated partly or completely by 90°.

A so-called grid polarization device (also called wire grid or metal grid polarization device or "Wire Grid" polarizer (WGP)) has the property that light having the desired direction of polarization is transmitted, while light having the direction of polarization perpendicular thereto is reflected.

Figure 13:
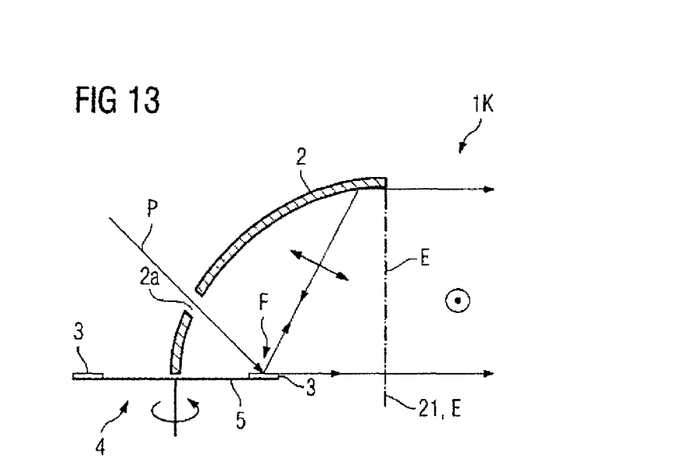
FIG. 13 shows a view, in section, of a LARP lighting device according to another embodiment of the invention.

FIG. 13 shows the use of a grid polarization device 21 on the basis of the lighting device 1K in combination with a parabolic reflector 2. The grid polarization device 21 arranged in the light exit plane E returns and diffusely reflects the undesired polarization component onto the at least one phosphor region 3, which brings about a depolarization. With complete depolarization, half of the diffusely reflected light is now again transmitted at the grid polarization device 21 ("polarization recycling").

Figure 14:
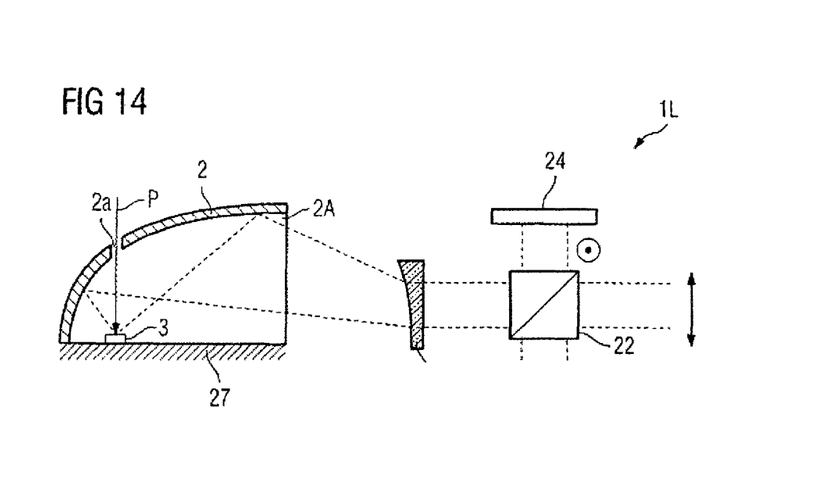
FIG. 14 shows a view, in section, of a LARP lighting device according to another embodiment of the invention.

A similar construction is shown in FIG. 14 on the basis of the lighting device 1L. The lighting device 1L uses a polarization beam splitter 22 (upstream of which here a collimator lens 23 is disposed) instead of the grid polarization device 21. The polarization beam splitter 22 here transmits a desired polarization component and reflects the undesired polarization component onto a mirror 24. The undesired polarization component is reflected back on itself by the mirror 24 and depolarized by the diffuse reflectance of the at least one luminous region 3 analogously to example 13.

The lighting device 1L does not use a rotatable phosphor carrier 4, rather the phosphor region 3 is arranged in a stationary manner on a stationary heat sink 27. However, alternatively, a rotatable phosphor carrier 4 can also be used.

Figure 15:
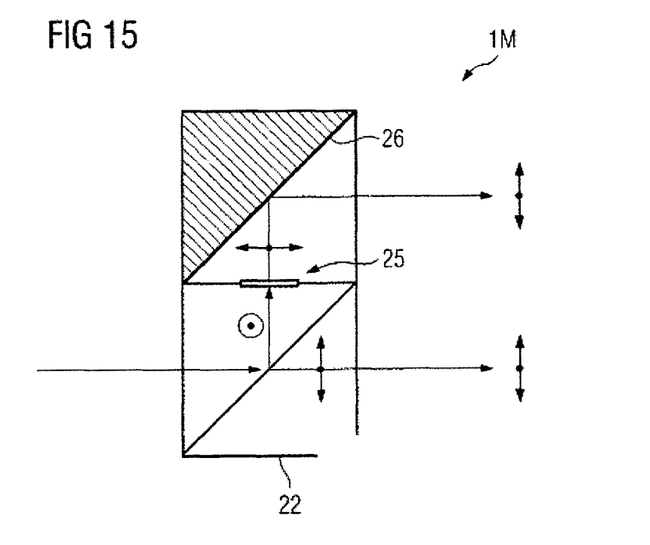
FIG. 15 shows a view, in section, of a LARP lighting device according to another embodiment of the invention.

FIG. 15 shows a lighting device 1M similar to the lighting device 1L, which uses a half-wave plate 25 instead of the back-reflecting mirror 24. For this purpose, the polarization beam splitter 22 is used in conjunction with the downstream half-wave plate 25 and a further mirror 26, as a result of which the undesired polarization component is rotated by 90° and is thus directly usable.

It goes without saying that the present invention is not restricted to the exemplary embodiments shown.

Generally, features of different exemplary embodiments can be used alternatively or additively.

By way of example, a full-shell reflector or a combination of a plurality of half-shell reflectors may also be used instead of one half-shell reflector.

The at least one luminous region is preferably, but not necessarily, situated at a focal point of the reflector.

Moreover, one or a plurality of immobile or stationary phosphor regions may generally be used instead of the rotatable phosphor carrier.

Generally, the rotatable phosphor carrier may be irradiated on one side or on both sides.

The invention claimed is:

1. A lighting device, comprising at least one reflector, at least one luminous region containing phosphor, and at least one laser, wherein the at least one luminous region is adapted to be excited to emit light by at least one laser and at least part of the light emitted by the at least one luminous region is incident on the at least one reflector,
    wherein the at least one phosphor region is arranged on a rotating phosphor carrier,
    wherein the rotating phosphor carrier has a plurality of phosphor regions which emit light of different colors,
    wherein a filter wheel having a plurality of filter segments is disposed optically downstream of the rotating phosphor carrier,
    wherein the filter wheel is synchronized with the rotating phosphor carrier, and
    wherein the filter segments of the filter wheel have a transmission property coordinated with the light emitted by the phosphor regions.

2. The lighting device as claimed in claim 1, wherein at least one optical integrator for combining the light emitted from the at least one reflector is disposed downstream of the at least one reflector.

3. The lighting device as claimed in claim 1, wherein the rotating phosphor carrier has a plurality of segments that can be illuminated by the at least one laser, wherein at least one segment has a respective phosphor region and at least one segment has a window for the wavelength-invariant transmission of light incident on the window.

4. The lighting device as claimed in claim 1,
    wherein the lighting device is designed to split light emerging from the at least one reflector into substantially different spatial regions depending on a color of the emerging light,
    wherein the lighting device has at least one color-selective reflector in at least one of the spatial regions, and
    wherein the at least one color-selective reflector is provided for reflecting light of a color provided for a different spatial region.

5. The lighting device as claimed in claim 4, wherein the at least one color-selective reflector is a dichroic mirror.

6. The lighting device as claimed in claim 1, wherein the lighting device is configured to transmit light having a predetermined direction of polarization from the at least one reflector and to reflect light having a direction of polarization perpendicular thereto back into the at least one reflector.

7. The lighting device as claimed in claim 6, wherein the lighting device is configured to transmit light having a predetermined direction of polarization from the at least one reflector and to reflect light having a direction of polarization perpendicular thereto back onto the at least one luminous region.

8. The lighting device as claimed in claim 6, wherein the lighting device has at least one grid polarization device.

9. The lighting device as claimed in claim 6, wherein the lighting device has at least one polarization beam splitter.

10. The lighting device as claimed in claim 9, wherein at least one half-wave plate is disposed downstream of the at least one polarization beam splitter.

11. The lighting device as claimed in claim 1, wherein the at least one reflector has at least one half-shell reflector.

12. The lighting device as claimed in claim 1, wherein the at least one reflector has at least one elliptical reflector and the at least one elliptical reflector is lengthened beyond a minor vertex of an ellipse on which its contour is based.

13. The lighting device as claimed in claim 1, wherein the lighting device is an automobile lighting device.

* * * * *